United States Patent
Waller (10) Patent No.: US 8,336,072 B2
(45) Date of Patent: Dec. 18, 2012

(54) TELEVISION RECEIVER DEVICE

(75) Inventor: Arthur Simon Waller, Addlestone (GB)

(73) Assignee: Sony United Kingdom Limited, Weybridge (GB)

( * ) Notice: Subject to any disclaimer, the term of this patent is extended or adjusted under 35 U.S.C. 154(b) by 467 days.

(21) Appl. No.: 12/619,139

(22) Filed: Nov. 16, 2009

(65) Prior Publication Data

US 2010/0186048 A1     Jul. 22, 2010

(30) Foreign Application Priority Data

Jan. 22, 2009   (EP) .................................... 09250167

(51) Int. Cl.
*H04N 5/445* (2011.01)
(52) U.S. Cl. ............. 725/59; 725/38; 725/139; 725/151
(58) Field of Classification Search .................... 725/38, 725/59, 131, 139, 151; 348/731
See application file for complete search history.

(56) References Cited

U.S. PATENT DOCUMENTS

| | | | |
|---|---|---|---|
| 6,473,129 B1 * | 10/2002 | Choi | 348/465 |
| 7,100,183 B2 * | 8/2006 | Kunkel et al. | 725/34 |
| 2004/0100585 A1 | 5/2004 | Ikeguchi | |
| 2006/0061682 A1 | 3/2006 | Bradley et al. | |
| 2007/0101370 A1 | 5/2007 | Calderwood | |

FOREIGN PATENT DOCUMENTS

WO  WO 2008/070133 A2 *  6/2008

OTHER PUBLICATIONS

Summons to attend oral proceedings pursuant to Rule 115(1) EPC issued Jan. 30, 2012, in European Patent Application No. 09250167.5.

P. Venkat Rangan, et al., "Continuity and Synchronization in MPEG," IEEE Journal on Selected Areas in Communications, vol. 14, No. 1, Jan. 1996, XP011054434, pp. 52-60.

* cited by examiner

*Primary Examiner* — Kristine Kincaid
*Assistant Examiner* — Sumaiya A Chowdhury
(74) *Attorney, Agent, or Firm* — Oblon, Spivak, McClelland, Maier & Neustadt, L.L.P.

(57) ABSTRACT

A television receiver device including first and second tuners for receiving first and second multiplexes of channels, each multiplex including at least one channel carrying a succession of programs, actual event information providing information relating to channels in the respective multiplex and other event information providing information relating to channels of other multiplexes. A program is scheduled to be broadcast at the same time in different first and second formats respectively in the first and second multiplexes. The device further includes a user interface configured to allow selection of a channel of said first multiplex; a controller configured to tune said first tuner to said first multiplex and to select said channel of said first multiplex; wherein the controller is configured to be responsive to the channel selected by the user interface carrying said program to tune said second tuner to said second multiplex. The device further includes an event unit configured to acquire from said second multiplex actual event information for said program.

14 Claims, 4 Drawing Sheets

TELEVISION RECEIVER DEVICE

CROSS-REFERENCE TO RELATED APPLICATIONS

This application is based upon and claims the benefit of priority from European Application No. 09250167.5 filed 22 Jan. 2009, the entire contents of which are incorporated by reference.

BACKGROUND OF THE INVENTION

1. Field of the Invention

The present invention relates to a television receiver device and a method of receiving television broadcasts, in particular where different multiplexes of channels simultaneously carry the same television programme, but in different formats, for instance with standard-definition image quality and with high-definition image quality.

2. Description of the Related Art

It is now becoming more common to broadcast television programmes with high-definition pictures. Because not all users are able to receive or view such high-definition pictures, it is known to broadcast the same television programme simultaneously in two different formats, in particular a more traditional format, such as standard definition and a newer format such as high definition.

These simultaneous broadcasts usually occur in digital television transmission in different respective multiplexes of channels. In particular, it will be appreciated that individual channels, each transmitting a succession of television programmes, are bundled together as groups of channels, each channel in a respective multiplex. A digital television receiver uses a tuner to obtain a particular multiplex and a desired channel is selected by demultiplexing packets of data of that channel from the multiplex.

Prior art, such as US 2007/0101370, recognises the problem that when a user selects a particular programme with standard definition, that user might not be aware that the same programme is also available on another channel in high definition. US 2007/0101370 proposes modifying an electronic programme guide such that, when a user selects a channel and the programme being transmitted on that channel is also available in high definition on another channel, that other channel is moved in the electronic programme guide so as to be displayed alongside the channel selected by the user. If the user attempts to record the standard-definition programme, the system may also provide a prompt to the user, allowing the user alternatively to record the high-definition version of the programme. Where a system includes two tuners, US 2007/0101370 also proposes that one of the two versions of the programme can be displayed in a PIP (picture-in-picture) window so that a user is able visually to confirm that the two programmes are indeed the same.

US 2006/0061682 also considers the possibility of simultaneously broadcasting a programme in two formats and proposes prompting a user to switch to a high-definition channel.

According to the prior art, establishing that a corresponding high-definition channel exists can be achieved by consulting a list of known standard-definition/high-definition channel pairs or searching through an electronic programme guide for a similar programme, for instance searching by title. US 2006/0061682 indicates that tables defined by the Moving Pictures Expert Group (MPEG) standards and related standards could support information that may be used to associate virtual channels carrying simulcast standard-definition and high-definition programming.

SUMMARY OF THE INVENTION

The present invention is based at least partly on a recognition that these earlier proposals for identifying simulcast broadcasts are often inadequate, particularly when it comes to identifying the precise starting time of the simulcast programme being broadcast on another channel. The playout system operated by the broadcaster for the simulcast programme may not be closely linked (if at all) with the playout system for the original programme. This means that the two programmes do not start and end at exactly the same time and there may be a difference of some minutes. This can cause problems if the user wants to switch between the two programmes.

The present invention considers a broadcast environment including at least first and second multiplexes of channels, each multiplex including at least one channel carrying a succession of programmes, actual event information providing information relating to channels in that respective multiplex and other event information providing information relating to channels of other multiplexes, wherein a programme is scheduled to be broadcast at the same time in different first and second formats respectively in the first and second multiplexes.

According to present invention, the method includes operating a first tuner to obtain the first multiplex, selecting, in the first multiplex, a channel in which the programme is broadcast, operating a second tuner to obtain the second multiplex and acquiring from the second multiplex actual event information for the programme.

Thus, when a user uses a first tuner to obtain the first multiplex and selects, in the first multiplex, a channel in which the programme is broadcast, the method of the invention uses a second tuner to obtain the second multiplex and acquire actual event information for the programme in the second multiplex.

According to the present invention, there is also provided a television receiver device including first and second tuners for receiving first and second multiplexes of channels, each multiplex including at least one channel carrying a succession of programs, actual event information providing information relating to channels in the respective multiplex and other event information providing information relating to channels of other multiplexes, wherein a programme is scheduled to be broadcast at the same time in different first and second formats respectively in the first and second multiplexes. The device further includes a user interface configured to allow selection of a channel of said first multiplex and a controller configured to tune said first tuner to said first multiplex and to select said channel of said first multiplex. The controller is configured to be responsive to the channel selected by the user interface carrying said programme to tune said second tuner to said second multiplex. The device further includes an event unit configured to acquire from said second multiplex actual event information for said program.

The actual event information provided with a multiplex is repeated much more often than the other event information. Typically, for event information tables according to the DVB standard, the actual event information may be repeated every 2 seconds whereas the other event information may be repeated only every 30 seconds. Indeed, not all broadcasters will provide the other event information at all.

Thus, according to the present invention, having identified the scheduled simulcast of a programme using techniques known from the prior art and/or event linkage or association information broadcast with the programmes, reference is made directly to the actual event information transmitted for the channel/multiplex on which the simulcast broadcast takes place. This information can be used by the controller of the television receiver device accordingly.

Preferably, the first format includes television images in standard definition and the second format includes television images in high definition.

It will be appreciated that the invention can also be used to select lower-definition images, to select alternative-aspect-ratio images and/or to select alternative audio formats.

Selection of a channel by a user can be selection by that user to view a programme at that time. Alternatively or additionally, selection by the user can be selection to record a particular programme. In either or both cases, it becomes possible with the present invention to provide accurate information regarding the simulcast of the programme selected by the user.

The first and second multiplexes may be broadcast independently. They may be broadcast as part of the same transmission system or may be broadcast in different transmission systems. Examples of the transmission systems include terrestrial, cable, satellite and network systems.

Preferably, the actual event information is contained in an event information table (EIT). Such a table is defined in the DVB standard.

The actual event information may include an event linkage descriptor indicating scheduled broadcast of a programme of the respective multiplex on another multiplex at the same time.

In this way, when a particular programme is selected, the event linkage descriptor associated with that broadcast programme provides an indication of the channel of another multiplex on which that same programme will be broadcast as a simulcast.

Preferably, the controller is configured to determine from an event linkage descriptor in the first multiplex that the programme is scheduled to be broadcast at the same time in a channel of the second multiplex.

In this way, it is then possible to acquire from the second multiplex the actual event information for the simulcast programme.

It is possible to acquire from the first multiplex actual event information for the first multiplex and other event information for the second multiplex. It is then possible to determine from the actual event information and the other event information acquired from the first multiplex whether a programme broadcast in a channel of the first multiplex, in particular the programme selected by the user, is scheduled to be broadcast at the same time in a channel of the second multiplex.

In the television receiver device, the event unit may be constructed so as to include a first event unit configured to acquire actual event information from the first multiplex and a second event unit configured to acquire actual event information from the second multiplex.

The television receiver device may respond to simultaneous broadcast of the programme in the second multiplex in one or more of a number of ways.

The user interface may indicate to the user that the programme is being simultaneously broadcast in the second format on another channel. The user can then choose to take whatever action he or she prefers.

The user interface may also prompt the user to change selection to the channel of the second multiplex carrying the programme. For example, the user interface may merely invite the user to select an input key, for example within a predetermined period of time, to cause re-selection to the channel of the second multiplex.

It is also possible for the device automatically to change selection to the channel of the second multiplex carrying the programme.

The television receiver device may allow a user to select in advance how the television receiver device will react to simultaneous broadcast of a programme in the second multiplex.

In the case where the programme in the second multiplex starts before the programme in the first multiplex, it will not necessarily be clear that the user will be interested in that programme at all. However, in addition to any of the options mentioned above, it is also possible to store in a buffer the programme from the second multiplex so as to enable the user to select the programme from the second multiplex when the programme from the first multiplex starts.

In this way, the user is able to watch to its end any programme being broadcast in the first multiplex before then deciding whether or not to watch the simulcast programme and to avoid missing any of the simulcast programme if the second multiplex is then chosen.

For the occasions when the channel selection has been changed from the channel of the first multiplex carrying the programme to the channel of the second multiplex carrying the programme, the controller may be configured to change selection, at the end of the programme, back to the channel of the programme in the first multiplex. The controller can be configured to make this change automatically or it can be configured to provide a prompt to the user, allowing the user to choose to make the change.

It will be appreciated that the television receiver device can be embodied as a stand-alone receiving device or integrated with one or both of a recording device, such as a PVR (personal video recorder), or display device.

Similarly, the present invention may be embodied in software for controlling parts of a device to operate as discussed above.

DETAILED DESCRIPTION OF THE PREFERRED EMBODIMENTS

The invention will be more clearly understood from the following description, given by way of example only, with reference to the company drawings.

Television programmes may be broadcast to end users in a number of different formats and by means of a variety of different broadcast systems. Standards such as MPEG allow bundles of broadcast channels to be provided together as respective multiplexes. Each multiplex thus contains a plurality of channels. A receiving device uses a tuner to select a particular multiplex and then demultiplexes the packets of a desired channel so as to reproduce that desired channel.

Different broadcasters may choose to use different broadcasting systems in order to broadcast content. For instance, terrestrial, satellite, cable and network systems are used. The individual broadcasters may choose to broadcast the same content, namely television programmes, in different formats, for instance in view of the bandwidth available to their broadcasting system, or merely to provide choice to the end users. Hence, one individual broadcaster may actually choose to broadcast the same television programme in more than one format.

Figure 1:
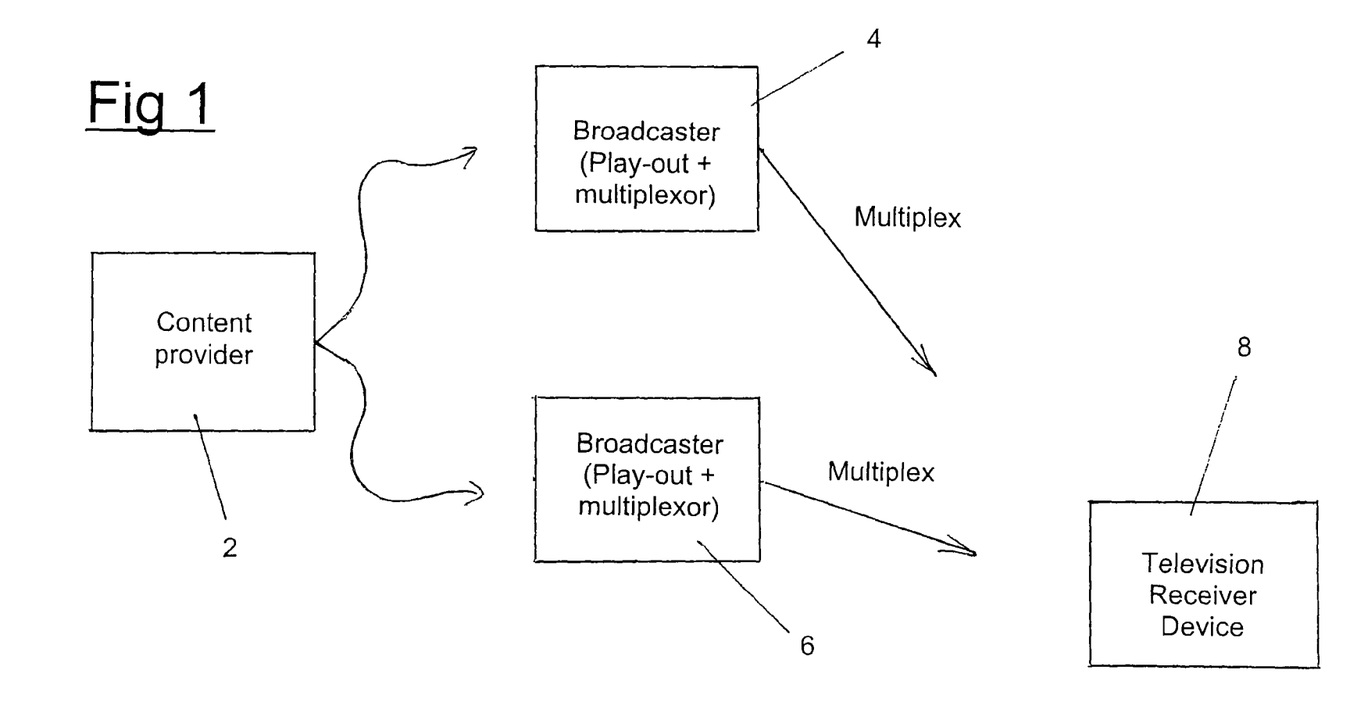
FIG. 1 illustrates schematically a broadcast environment in which the present invention may be embodied.

FIG. 1 illustrates schematically a broadcast environment in which a content provider 2 provides the same television programme to two different broadcasters 4, 6. The television programme will typically be provided to each broadcaster in advance of broadcast and each broadcaster will use its own respective playout system and multiplexer. A television receiver device 8 may be able to receive multiplexes from each of the broadcasters 4, 6. It will be appreciated that, in general, each broadcaster will broadcast a plurality of multiplexes, each multiplex containing a plurality of channels. However, for an explanation of the present invention, it will be assumed that the first broadcaster 4 broadcasts at least a first multiplex including a channel on which a particular programme is to be broadcast and the second broadcaster 6 broadcasts at least a second multiplex containing a channel in which the same programme is to be broadcast as a simulcast. Actually, the invention is equally applicable to the situation where one and the same broadcaster broadcasts both the first multiplex and the second multiplex so as to achieve the simulcast of the same television programme.

Figure 2A:
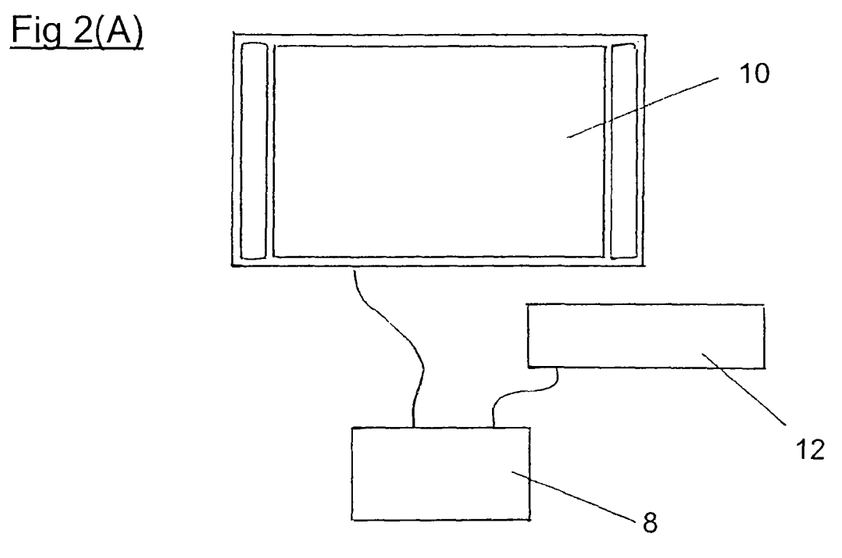
FIGS. 2(A), (B) and (C) illustrate examples of television receiver devices embodying the present invention.
Figure 2B:
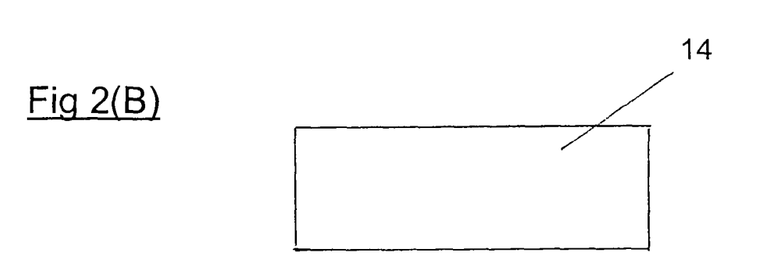
Figure 2C:
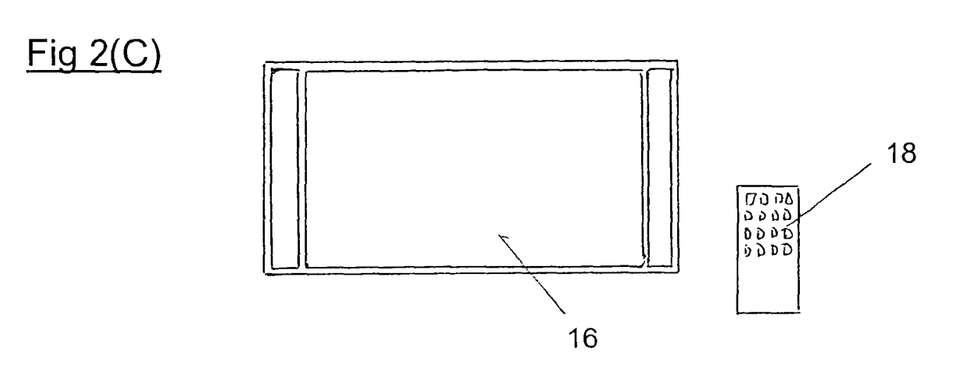

The television receiver device 8 may be embodied in any convenient manner, for instance as a stand-alone device as illustrated in FIG. 2(A) for use with a television display device 10 and/or a television recording device 12, such as a PVR (personal video recorder). Alternatively, the television receiver device could be incorporated into a television recording device 14 as illustrated in FIG. 2(B) or incorporated in a television display device 16 as illustrated in FIG. 2(C), which might additionally incorporate the television recording device.

Figure 3:
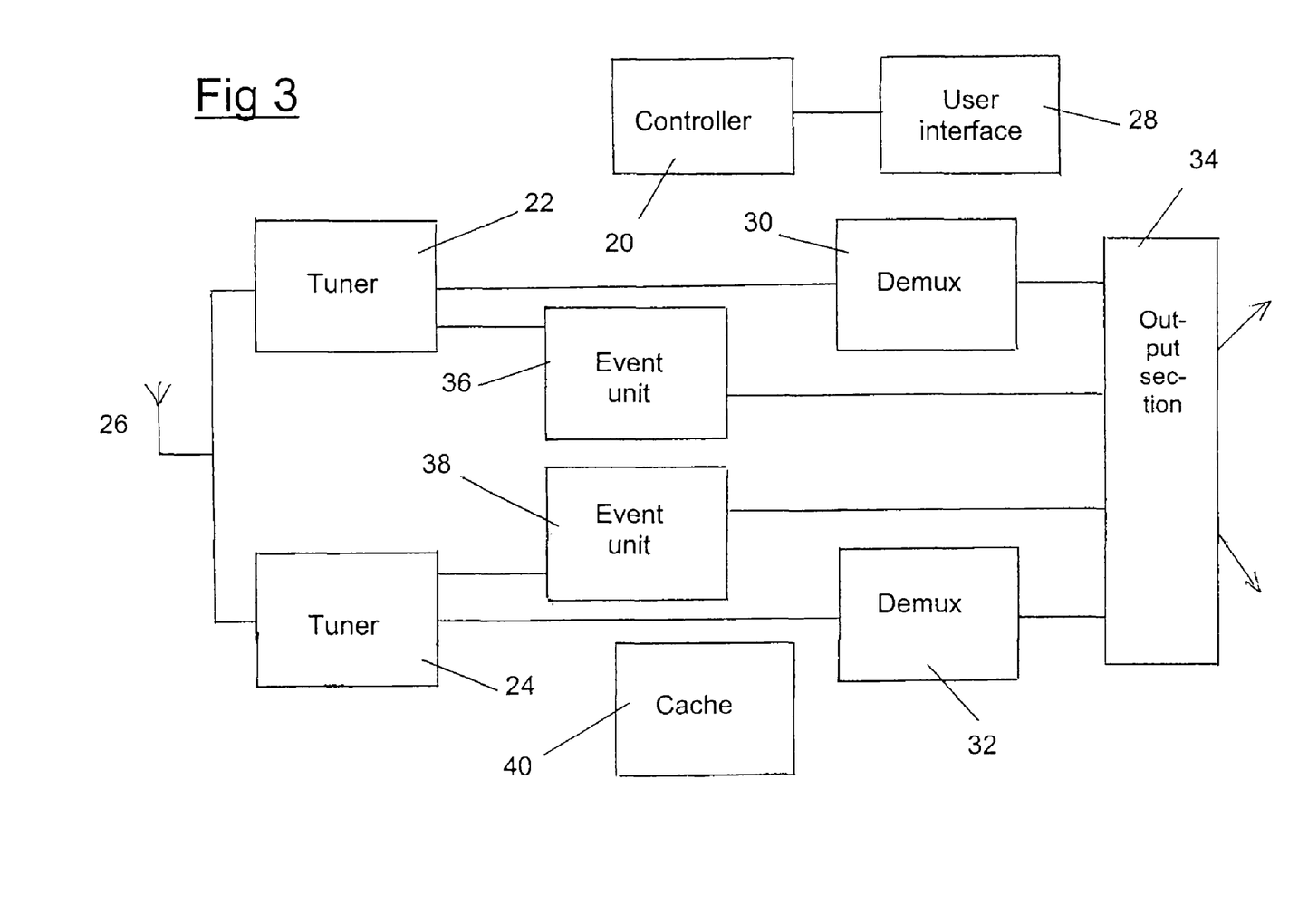
FIG. 3 illustrates schematically functional component part of a television receiver device embodying the present invention.

FIG. 3 illustrates schematically the relevant functional component parts of a television receiver device embodying the present invention.

A controller 20 is provided in communication with the other functional component parts of the device and is configured to control those functional parts and also to carry out processes embodying the present invention.

A first tuner 22 and a second tuner 24 are illustrated both connected to an aerial 26 so as to represent reception of one or more broadcast signals. However, it will be appreciated that the first tuner 22 and second tuner 24 need not receive broadcast signals from the same source and, furthermore, may receive broadcast signals from any appropriate source and not necessarily a conventional aerial.

Using a user interface 28, such as the remote control device 18 illustrated in FIG. 2(C), a user is able to choose a broadcast channel for selection by the device. In response to this choice, the controller 20 controls the first tuner 22 to obtain the appropriate multiplex containing the required channel.

In any known manner, a first demultiplexer 30 can demultiplex the received multiplex so as to acquire the necessary packets for the chosen channel and re-assemble the broadcast signal for that channel.

As illustrated, a second demultiplexer 32 is provided so as to enable similar demultiplexing of any multiplex obtained by the second tuner 24.

An output section 34 is illustrated as receiving signals from either or both of the demultiplexers 30 and 32 and is able to provide corresponding broadcast signals to one or both of a display device 10 and a recording device 12.

It is known to provide with a broadcast multiplex actual event information which provides information relating to the channels contained within that respective multiplex as well as other event information providing information regarding channels broadcast in other multiplexes. The actual event information is transmitted frequently, for instance every 2 seconds, and is therefore always relatively accurate. On the other hand, the other event information may be transmitted less frequently, for instance once every 30 seconds, and, hence, is necessarily less up to date. Indeed, some broadcasters may not provide the other event information at all or may provide it only for a limited number of channels, for instance the other channels provided by that broadcaster.

The DVB standard includes an example of actual event information and other event information. In this respect, reference may be made to the publication ETSI EN 300 468 V1.8.1 (2008-07).

A broadcast multiplex may also include additional data and it may be possible to use this data to provide a link to the channel of a different multiplex in which the same programme is to be broadcast as a simulcast. This data could be described as a linkage descriptor. By way of example, the DVB standard defines an event information table (EIT) in which it would be possible to include a linkage descriptor providing a link to an event on the channel of a different multiplex. In particular, this linkage descriptor can be used to identify when a particular programme is to be broadcast simultaneously on the channel of a different multiplex, for instance in a different format, such as high definition.

The DVB publication mentioned above describes the Event Information Table (EIT) in Section 5.2.4.

Similar Service Information tables can be produced in television broadcasts made according to standards other than DVB, for example including ATSC (Advanced Television Systems Committee).

The problem with using information from one multiplex with regard to broadcast of a programme in a channel of another multiplex is that the information regarding that other multiplex might be limited, might be re-transmitted infrequently and might indeed have errors or omissions.

Returning to FIG. 3, the television receiver device is illustrated schematically including a first event unit 36 and a second event unit 38.

The first event unit 36 is configured to be able to identify and read information contained with the multiplex obtained by the first tuner 22, for instance identifying and reading actual event information, other event information and/or the linkage descriptor mentioned above. The second event unit 38 may be configured similarly. However, for the purposes of the present invention, it is configured in any case to acquire the actual event information for any multiplex obtained by the second tuner 24.

For the channel chosen by the user and selected according to the user interface 28, the controller 20 is configured to determine whether or not there is a programme coming up in that channel for which there is scheduled to be another broadcast of that same programme in a different channel of another multiplex, in particular a broadcast in a different format. In this respect, the controller may use information acquired by the first event unit 36, such as the other event information and/or the linkage descriptor. The controller 20 may also have details, from the actual event information acquired by the first event unit 30, for the other programmes coming up in the selected channel.

Thus, using this information and/or information derived from other sources, for instance an electronic programme guide, the controller 20 determines that there is scheduled to be a simulcast of a programme on the selected channel or indeed that a simulcast is currently in progress for the selected channel.

With the knowledge that a simulcast will or is occurring on the channel of another multiplex, the controller 20 controls the second tuner 24 to tune to that multiplex. It also controls the second event unit 38 to acquire from the multiplex the actual event information relating to the broadcast of the programme.

In this way, the receiver device is aware of the most accurate and the most often refreshed information regarding the alternative broadcast of the same programme. In particular, the receiver device and its controller 20 are aware of accurate start and end times for that alternative broadcast of the same programme.

The receiver device is preferably configured to be able to provide notifications/messages to the user, for instance by means of the user interface 28 and/or the output 34 inserting into its output stream video/audio messages for reproduction by the television display device.

Figure 4:
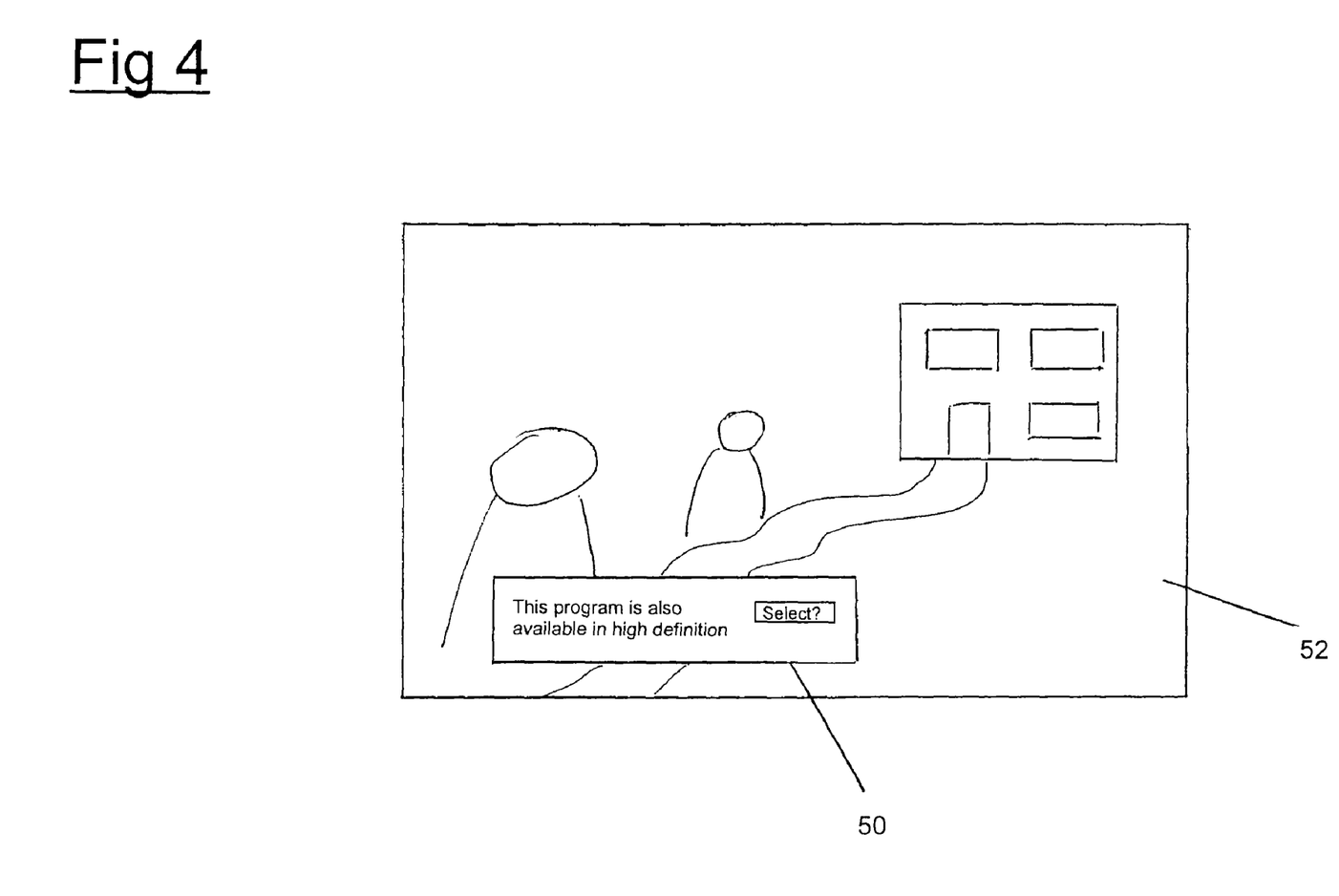
FIG. 4 illustrates an example of a user prompt.

FIG. 4 illustrates an example of a user notification 50 appearing superimposed on the video image 52 of the programme from the first multiplex. In this way, the controller 20 is able to provide information to the user regarding the alternative broadcast of the same programme based on the actual event information for that broadcast obtained by the second event unit 38.

There will now be considered the situation where the user has selected a channel of a first multiplex to which the first tuner 22 is tuned and that channel contains or will contain a programme in a first format. The second tuner 24 is then tuned to a second multiplex including a second channel which contains or will contain the same programme, but broadcast in a second format.

If the programme in the first format is starting and being viewed by the user, then the receiver device can alert the user that the same programme is available in the second format either then or shortly thereafter. Alternatively or additionally, if the programme in the first format has already started and is being viewed by the user, at the start of broadcast of that programme in the second format, the receiver device can alert the user to the availability of that programme in the second format. As illustrated in FIG. 4, that alert 50 could optionally provide the user with the possibility of choosing to change the channel selected to the channel broadcasting the programme in the second format. For instance, the user could be presented with the possibility of operating a particular input key to cause the receiver device to change channel selection. In other words, the user would not be required to go through any otherwise normal process for channel selection.

An alternative possibility would be for the receiver device to be configured to change to the channel broadcasting the programme in the second format automatically without any input from the user. Nevertheless, a notification could be provided to the user that the channel change has occurred.

When a channel change occurs, it would be possible for the controller to control the first tuner 22 and first demultiplexer 30 to retune to the new channel. However, with the embodiment as described with reference FIG. 3, it would only be necessary for the controller 20 to control the second demultiplexer 32 to acquire packets of the appropriate channel and to control the output section 34 to use the output of the second demultiplexer 32 rather than the first demultiplexer 30.

Where it happens that, despite the programme being scheduled to be broadcast in both channels (and both formats) at the same time, the broadcast of the programme in the second format starts before the broadcast in the first format, the user will still be watching a different programme in the channel of the first multiplex when the simulcast programme in the second format starts. In this situation, the receiver device can similarly provide a prompt or notification to the user providing information regarding the upcoming broadcast in the second format. Irrespective, a cache 40 may be provided in the television receiver device so as to be able to buffer data of a received television programme. In this way, in the time between start of the programme in the second format and start of the programme in the first format (in the channel currently selected by the user) the television programme in the second format can be buffered in the cache 40. If, at the start of the programme in the first format, the user decides to select the alternative channel broadcasting the same programme in the second format, that user is then able to view the programme in the second format without having missed the beginning of the programme.

In the situation where a user has changed the selected channel so as to view the programme in the second format, it is possible to configure the receiver device such that, at the end of the programme, the television receiver device returns to the original channel which was selected by the user. For instance, the controller 20 controls the output section 34 again to use data received from the first demultiplexer 30.

In a preferred embodiment, all of these various options are available to the user. The television receiver device may present the user with a setup process, for instance using setup menus in which the various options can be selectively chosen.

I claim:

1. A digital television receiver device comprising:
first and second tuners for receiving first and second multiplexes of channels, each multiplex including at least one channel carrying a succession of programs and actual event information providing information relating to channels in the respective multiplex and other event information providing information relating to channels of other multiplexes, wherein a program is scheduled to be broadcast at a same time in different first and second formats respectively in the first and second multiplexes;
a user interface configured to allow selection of a channel of said first multiplex;
a controller configured to tune said first tuner to said first multiplex and to select said channel of said first multiplex; and
an event unit configured to acquire, from said first multiplex, actual event information for said first multiplex and other event information for said second multiplex, said actual event information for said first multiplex being acquired, by said event unit via said first multiplex, more frequently than said other event information for said second multiplex, such that actual event information for a particular program has more up-to-date broadcast information than other event information for the particular program, wherein
said controller is configured to determine, from said actual event information and said other event information from said first multiplex, whether a program to be broadcast in a channel of the first multiplex is scheduled to be broadcast at the same time in a channel of the second multiplex, and, when the controller determines that a program broadcast in the channel selected by the user interface is scheduled to be broadcast at the same time in a channel of the second multiplex, said controller is configured to tune said second tuner to said second multiplex, and said event unit is configured to acquire, from said second multiplex, actual event information for said program scheduled to be broadcast in the channel of the second multiplex, such that the digital television receiver device has accurate start and end times for the broadcast of said program scheduled to be broadcast in the channel of the second multiplex.

2. A digital television receiver device according to claim 1 wherein the first format includes television images in standard definition and the second format includes television images in high definition.

3. A digital television receiver device according to claim 1 wherein selection of a channel by a user is one or more of selection to view the program and selection to record the program.

4. A digital television receiver according to claim 1 wherein first and second multiplexes are broadcast independently over one or more of a plurality of transmission systems including terrestrial, cable, satellite and network systems.

5. A digital television receiver device according to claim 1 wherein the actual event information is contained in an event information table.

6. A digital television receiver device according to claim 5 wherein the actual event information includes an event linkage descriptor indicating scheduled broadcast of a program of the respective multiplex on another multiplex at the same time.

7. A digital television receiver device according to claim 6 wherein said controller is configured to determine from the event linkage descriptor in the first multiplex that said program is scheduled to be broadcast at the same time in a channel of the second multiplex.

8. A digital television receiver device according to claim 5, wherein the event information table conforms to the DVB standard.

9. A digital television receiver device according to claim 1 wherein said event unit includes a first event unit configured to acquire actual event information from said first multiplex and a second event unit configured to acquire actual event information from said second multiplex.

10. A digital television receiver device according to claim 1 wherein said controller is configured, in response to broadcast of said program in said second multiplex, to one or more of:
  control the user interface to indicate to the user that the program is being broadcast in the second format on another channel;
  control the user interface to prompt the user to change selection to the channel of the second multiplex carrying the program or automatically change selection to the channel of the second multiplex carrying the program.

11. A digital television receiver device according to claim 10 wherein the controller is configured, when said program in said second multiplex starts before said program in said first multiplex, to:
  store in a buffer said program from the second multiplex so as to enable the user to select said program from the second multiplex when said program from the first multiplex starts.

12. A digital television receiver device according to claim 1 wherein said controller is configured, when channel selection has been changed from the channel of said first multiplex carrying said program to the channel of said second multiplex carrying said program, to change selection, at the end of said program in said second multiplex, back to the channel of said program in said first multiplex.

13. A method of receiving broadcasts having at least first and second multiplexes of channels, each multiplex including at least one channel carrying a succession of programs and actual event information providing information relating to channels in the respective multiplex and other event information providing information relating to channels of other multiplexes, wherein a program is scheduled to be broadcast at a same time in different first and second formats respectively in the first and second multiplexes, the method comprising:
  operating a first tuner of a receiver to obtain said first multiplex;
  selecting, in said first multiplex, a channel in which said program is broadcast;
  acquiring, from said first multiplex, actual event information for said first multiplex and other information for said second multiplex, said actual event information for said first multiplex being acquired, from said first multiplex, more frequently than said other event information for said second multiplex, such that actual event information for a particular program has more up-to-date broadcast information than other event information for the particular program;
  determining, from said actual event information and said other information from said first multiplex, whether a program to be broadcast in a channel of the first multiplex is scheduled to be broadcast at the same time in a channel of the second multiplex;
  responsive to determining that a program broadcast in the channel selected in the first multiplex is scheduled to be broadcast at the same time in a channel of the second multiplex, operating a second tuner of the receiver to obtain said second multiplex; and
  acquiring, from said second multiplex, actual event information for said program scheduled to be broadcast in the channel of the second multiplex, such that the receiver has accurate start and end times for the broadcast of said program scheduled to be broadcast in the channel of the second multiplex.

14. A non-transitory computer-readable storage medium comprising program code for performing a process when said program code is executed by a computer, said process including receiving broadcasts having at least first and second multiplexes of channels, each multiplex including at least one channel carrying a succession of programs and actual event information providing information relating to channels in the respective multiplex and other event information providing information relating to channels of other multiplexes, wherein a program is scheduled to be broadcast at a same time in different first and second formats respectively in the first and second multiplexes, the process comprising:
  operating a first tuner of a receiver to obtain said first multiplex;
  selecting, in said first multiplex, a channel in which said program is broadcast;
  acquiring, from said first multiplex, actual event information for said first multiplex and other information for said second multiplex, said actual event information for said first multiplex being acquired, from said first multiplex, more frequently than said other event information for said second multiplex, such that actual event information for a particular program has more up-to-date broadcast information than other event information for the particular program;
  determining, from said actual event information and said other information from said first multiplex, whether a program to be broadcast in a channel of the first multiplex is scheduled to be broadcast at the same time in a channel of the second multiplex;

responsive to determining that a program to be broadcast in the channel selected in the first multiplex is scheduled to be broadcast at the same time in a channel of the second multiplex, operating a second tuner of the receiver to obtain said second multiplex; and acquiring, from said second multiplex, actual event information for said program scheduled to be broadcast in the channel of the second multiplex, such that the receiver has accurate start and end times for the broadcast of said program scheduled to be broadcast in the channel of the second multiplex.

* * * * *